No. 760,522. PATENTED MAY 24, 1904.
J. CROMWELL, Jr.
ASH SIFTER.
APPLICATION FILED MAR. 4, 1903. RENEWED MAR. 1, 1904.
NO MODEL.
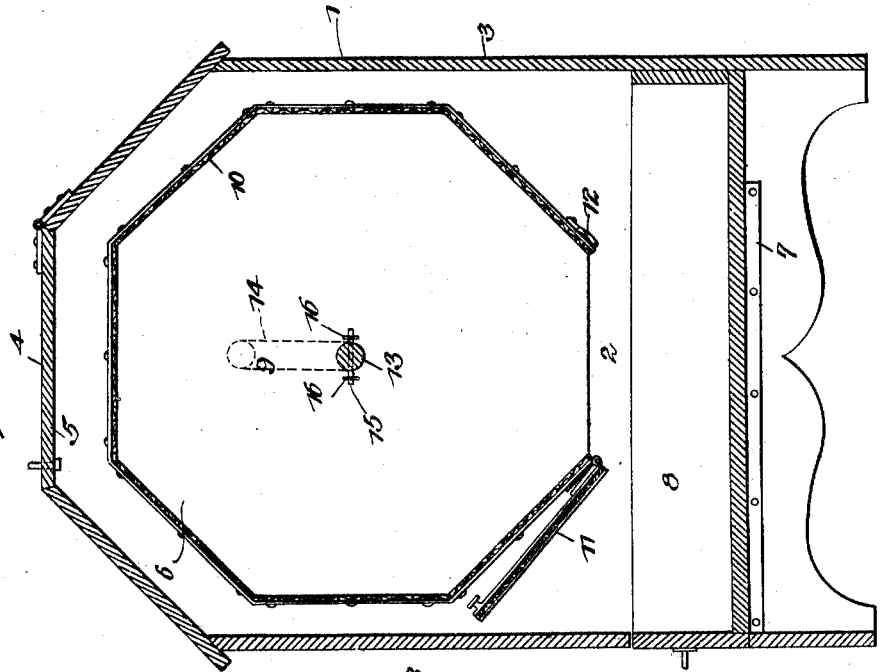
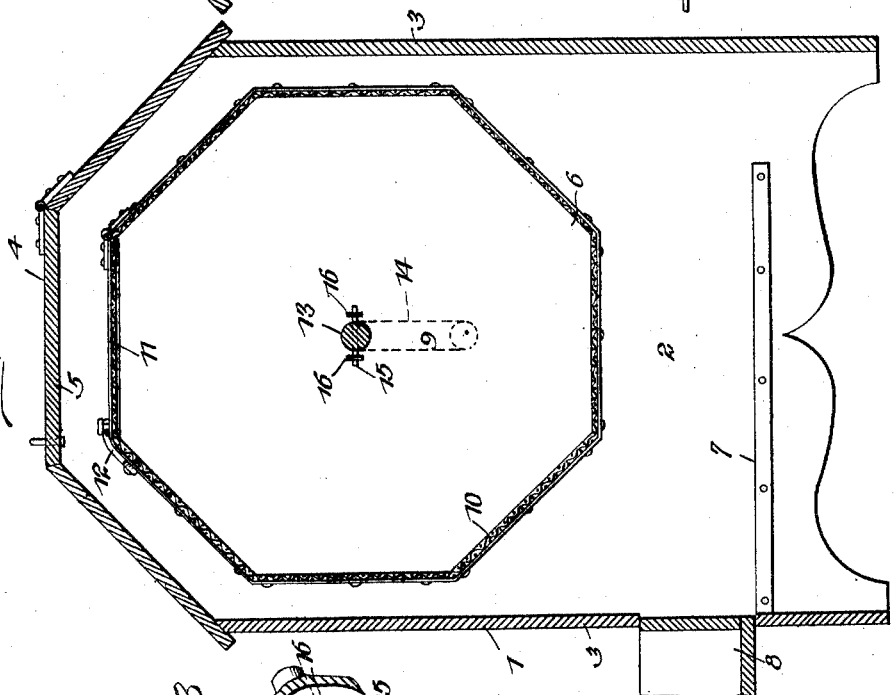
Joseph Cromwell, Jr. Inventor No. 760,522. Patented May 24, 1904.

UNITED STATES PATENT OFFICE.

JOSEPH CROMWELL, JR., OF BALTIMORE, MARYLAND.

ASH-SIFTER.

SPECIFICATION forming part of Letters Patent No. 760,522, dated May 24, 1904.

Application filed March 4, 1903. Renewed March 1, 1904. Serial No. 196,053. (No model.)

*To all whom it may concern:*

Be it known that I, JOSEPH CROMWELL, Jr., a citizen of the United States, residing in the city of Baltimore, in the State of Maryland, have invented a new and useful Ash-Sifter, of which the following is a specification.

My invention relates to ash-sifters, and has for its objects to produce a device of this character which will be simple of construction, efficient in operation, one in which the cinders may, after being thoroughly separated from the ashes, be deposited in a removable receptacle carried by the framework or casing of the device, one in which the tracks or ways upon which the removable receptacle travels will be automatically freed by the insertion of the receptacle of any ashes which may lodge beneath, and one in which the rotary sifting-drum will be securely and fixedly connected with its operating-shaft in a simple and efficient manner.

To these ends the invention comprises the novel details of construction and combination of parts more fully hereinafter described.

In the accompanying drawings, Figure 1 is a longitudinal sectional elevation of my improved device. Fig. 2 is a similar view illustrating the device in the dumping position. Fig. 3 is a detailed sectional view, on an enlarged scale.

Referring to the drawings, 1 indicates a casing of any suitable material, which comprises side walls 2, end walls 3, and a top cover 4, which latter is provided with a hinged lid 5, normally closing an opening through which the ashes are placed into the rotary drum 6, more fully described hereinafter. The inner side walls of the casing have attached to them by screwing or otherwise horizontal rails 7, which sustain a removable draw or like receptacle 8, which receives the cinders from the sifting-drum, as hereinafter explained, and further serves as a temporary closure for the bottom of the casing. In this connection it is to be noted that the rails 7 terminate short of the end wall 3 in rear of the draw 8, whereby the draw will when inserted into position free the rails of any ashes or the like which may accumulate upon them during the sifting operation.

The sifting-drum 6 preferably comprises a pair of spaced end boards or members 9 of octagonal or other polygonal form, and an outer peripheral covering 10, preferably of suitably-perforated sheet metal, though it may be of any other suitable interstitial material. The sifting-drum owing to its polygonal form will act to throw ashes from side to side, as will be readily understood, thus more thoroughly agitating them and separating the cinders therefrom. The sifting-drum is provided with a hinged cover 11, adapted to be temporarily locked in its closed position by a suitable latching device 12. The cover permits of the material to be treated being placed within the drum. At this point it is to be noted that when it is desired to fill the drum with material the hinged lid 5 of the casing is thrown open, the drum is rotated to bring its opening to the proper position, and its cover 11 is in turn opened, when the material may be placed into the drum, as will be readily understood. When it is desired to remove the cinders from the drum after the completion of the sifting operation, the draw is inserted, the cover 11 of the drum is opened, and the same is partially rotated to cause the cinders to be discharged into the draw, as illustrated in Fig. 2.

The drum 6 is fixedly mounted upon a rotatable shaft 13, which is journaled at its ends in bearings formed in the sides 2 of the casing, one end of the shaft being extended beyond the casing and bent to form an operating-crank 14. The drum is mounted on the shaft by inserting the latter through suitable concentric perforations formed through the end members 9, the drum being fixed upon the shaft by means of pins 15 inserted in transverse perforations through the latter and attached to the end members of the drum by staples or like fastening means 16. Each pin is secured to the adjacent end member of the drum by means of a pair of the staples 16, disposed one on each side of the shaft and each encircling one end of the pin and embedded directly into the material of the end member, whereby a simple and at the same time strong and durable connection is made which prevents lateral displacement or play of the end member due to its being rigidly connected with the pin at opposite sides of the shaft, and further obviates liability of the pin becoming bent.

From the foregoing it will be seen that I produce a simple device durable of construction and efficient in operation, and one which is admirably adapted for the attainment of the ends in view.

Having thus described the invention, what I claim is—

In a device of the class described, the combination with a casing, of a rotatable shaft journaled in bearings formed in the casing, a rotary drum fixedly mounted on the shaft and comprising end members and an interstitial covering associated therewith, said shaft being perforated transversely adjacent to each end member, and means for fixing the drum to the shaft for rotation therewith and for preventing lateral displacement of the end members, said means comprising pins inserted through the transverse perforations of the shaft one adjacent to each end member and secured to their respective end members each by means of a pair of staples embracing the pin one at each end and at opposite sides of the shaft, said staples having their ends embedded directly into the end members of the drum.

In testimony that I claim the foregoing as my own I have hereto affixed my signature in the presence of two witnesses.

JOSEPH CROMWELL, Jr.

Witnesses:
   JOHN W. WILTON,
   W. E. NICOLL.